(12) United States Patent
Miyake et al.

(10) Patent No.: US 6,560,169 B2
(45) Date of Patent: May 6, 2003

(54) MAGNETO-OPTICAL RECORDING AND REPRODUCTION APPARATUS EXHIBITING SUPPRESSED VIBRATION

(75) Inventors: Tomoyuki Miyake, Nara (JP); Seiichi Nagatome, Tenri (JP); Toshiyuki Tanaka, Moriguchi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/882,594

(22) Filed: Jun. 15, 2001

(65) Prior Publication Data

US 2002/0006082 A1 Jan. 17, 2002

(30) Foreign Application Priority Data

Jun. 15, 2000 (JP) .......................... 2000-180626

(51) Int. Cl.[7] ................................. G11B 11/00
(52) U.S. Cl. ................. 369/13.02; 369/13.04; 369/300; 369/247
(58) Field of Search .................. 369/247, 13.04, 369/13.02, 13.32, 300

(56) References Cited

FOREIGN PATENT DOCUMENTS

| JP | 5-314697 | 11/1993 | |
|---|---|---|---|
| JP | 5-325107 | 12/1993 | |
| JP | 9-265683 | * 10/1997 | ........... G11B/11/10 |

* cited by examiner

Primary Examiner—Aristotelis M. Psitos
(74) Attorney, Agent, or Firm—David C. Conlin; Steven M. Jensen; Edwards & Angell, LLP (57) ABSTRACT

A magneto-optical recording and reproduction device includes an optical pickup for irradiating a magneto-optical disk with a laser beam for performing at least one of information recording to a magneto-optical disk, information reproduction from the magneto-optical disk, and information erasure from the magneto-optical disk; a magnetic head for providing a magnetic field to a position of the magneto-optical disk irradiated with the laser beam for performing at least one of the information recording and the information erasure, the magnetic head being located opposite to the optical pickup with respect to the magneto-optical disk where the magneto-optical disk is mounted on the magneto-optical recording and reproduction device; a housing for accommodating the optical pickup; a guide shaft for moving the housing; a suspension for supporting the magnetic head; and an arm for connecting the suspension and the housing. The guide shaft is on a straight line extending in a direction perpendicular to a plane of the magneto-optical disk from the center of gravity of a combination of at least the arm, the magnetic head and the suspension, so as to suppress a vibration of the arm, with the guide shaft being a fulcrum of the vibration.

6 Claims, 10 Drawing Sheets

MAGNETO-OPTICAL RECORDING AND REPRODUCTION APPARATUS EXHIBITING SUPPRESSED VIBRATION

BACKGROUND OF THE INVENTION

1. Field of the Invention

The present invention relates to a magneto-optical recording and reproduction device usable in a magneto-optical disk apparatus such as, for example, a mini disk apparatus.

2. Description of the Related Art

Figure 12:
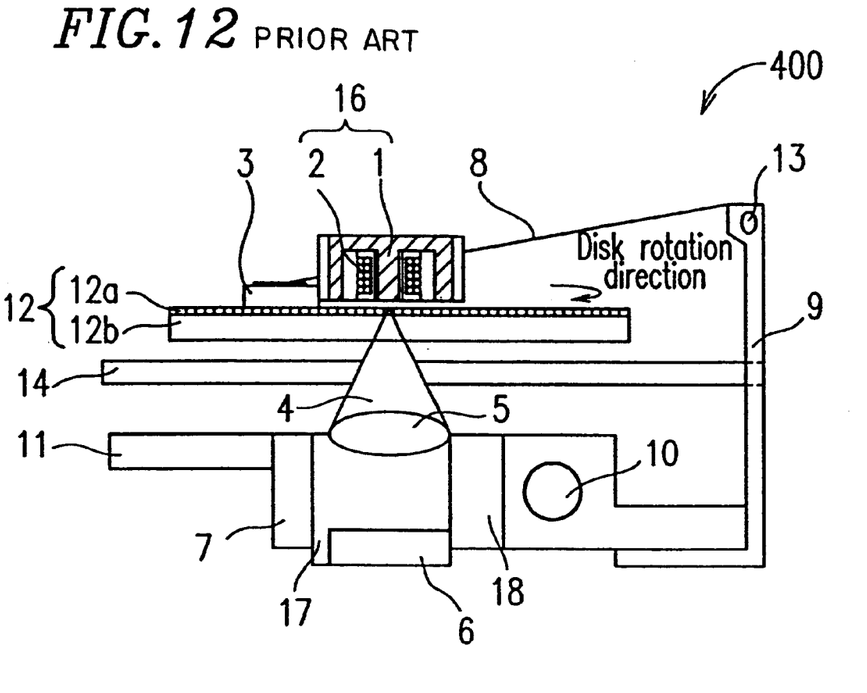
FIG. 12 is a cross-sectional view of a conventional magneto-optical recording and reproduction device.

FIG. 12 shows a conventional magneto-optical recording and reproduction device 400 used in a magneto-optical disk apparatus such as a mini disk (hereinafter, referred to as an MD) apparatus or the like. A magneto-optical disk 12 includes a magneto-optical recording medium 12a and a transparent substrate 12b.

The magneto-optical recording and reproduction device 400 includes an optical pickup housing 7 accommodating an optical pickup 17 for emitting a laser beam 4, a magnetic head 16 used for magnetic field modulation recording, a slidable member 3 (magnetic head slider), and a suspension 8 for pressing the slidable member 3 against the magneto-optical disk 12 with a constant load.

The optical pickup 17 includes an objective lens 5 for focusing the laser beam 4 which optically reproduces information from the magneto-optical disk 12 and which is used to raise the temperature of the magneto-optical recording medium 12a of the magneto-optical disk 12 when recording information to or erasing information from the magneto-optical disk 12, or when performing recording and erasing at the same time. The optical pickup 17 also includes a photodetector 6, and an actuator 18 for driving the objective lens 5 in a focusing direction or a radial direction of the magneto-optical disk 12 to adjust the position of the objective lens 5.

The magnetic head 16 includes a magnetic core 1 formed of a magnetic material such as Mn—Zn ferrite or the like, and a coil 2. The magnetic head 16 applies a magnetic field to a portion of the magneto-optical recording medium 12a which has had its temperature raised as described above by the laser beam 4.

The magneto-optical recording and reproduction device 400 further includes a magnetic head connection arm 9 for connecting the suspension 8 and the optical pickup housing 7 to each other, a guide shaft 10 which is a moving mechanism for moving the optical pickup housing 7 in a radial direction of the magneto-optical disk 12, and a sub-guide 11 for supporting the optical pickup housing 7. The magneto-optical recording and reproduction device 400 is incorporated into a chassis 14.

During an information recording or reproduction operation of the magneto-optical recording and reproduction device 400, a recording media surface of the magneto-optical disk 12 moves up and down in accompaniment with rotations of the magneto-optical disk 12. The magneto-optical recording and reproduction device 400 is structured to, during the information recording or reproduction operation, cause the actuator 18 to move the objective lens 5 up and down so as to follow the up-and-down movement of the recording media surface, so that the laser beam 4 is continuously focused on the recording media surface in a satisfactory manner.

During the information recording operation, the magnetic head 16 is on the recording media surface of the magneto-optical disk 12. For starting the information reproduction operation, the magnetic head 16 is lifted up from the recording media surface of the magneto-optical disk 12. Such an up-and-down movement of the magnetic head 16 is performed in order to extend the life of the magneto-optical disk 12 and the magnetic head 16 and reduce power consumption at a spindle (not shown) for rotating the magneto-optical disk 12. The magnetic head 16 is lifted up and lowered by, for example, a rotation mechanism 13, which is a hinge mechanism attached to the magnetic head connection arm 9, using a lifting plate (not shown) or the like. Currently, this structure is commonly used in magneto-optical recording and reproduction devices using a magnetic head.

In recent years, the size and weight of a magneto-optical disk apparatus have been reduced. For example, a disk used in an MD apparatus has a diameter which is as small as 64 mm. Techniques for reducing the size and the thickness of a magneto-optical recording and reproduction device have been actively developed to fit the device to the size of the disk. Furthermore, the magnetic field generation region in the magnetic head 16 for magneto-optical recording has been reduced due to the improvement in the recording density and data transmission rate. Therefore, extremely high level positioning and servo techniques of the optical pickup 17 are required.

When the size and the thickness of a magneto-optical disk apparatus are reduced, the weight of a device for driving the magneto-optical disk apparatus is also reduced, thus increasing the magnitude of vibration transmitted to a disk mounted on the magneto-optical disk apparatus. For example, referring to FIG. 12, the actuator 18 moves the objective lens 5 so as to follow the up-and-down movement of the magneto-optical disk 12. As a result, the actuator 18 vibrates, and the vibration of the actuator 18 is conveyed to the magnetic head connection arm 9. Since the vibration of the magnetic head connection arm 9 is transmitted to the magneto-optical disk 12, the magneto-optical disk 12 vibrates strongly. This causes a disturbance or a focus error in a focus servo system. The disturbance generated in the focus servo system can cause an adverse influence on the recording and reproducing characteristic of the magneto-optical recording and reproduction device. In the worst case, a recording and reproduction operation becomes impossible because the servo mechanism cannot provide sufficient control of the optical pickup 17 and the objective lens 5.

The data transmission rate during the recording and reproduction operation is required to be as high as possible. In order to obtain a higher speed than conventionally possible, inductance of the magnetic head 16 should be reduced. Such a reduction in inductance decreases the size of a magnetic pole of the magnetic head 16, which reduces the magnetic field generation region. Therefore, the position of the magnetic pole with respect to a laser spot on the magneto-optical disk 12 irradiated with the laser beam 4 is required to be more precise.

When reproducing the information stored on the magneto-optical disk 12 or taking out the magneto-optical disk 12 from the magneto-optical apparatus 400, the magnetic head 16 generally has to be significantly lifted up from the recording media surface of the magneto-optical disk 12. As shown in FIG. 12, the rotation mechanism 13, such as a hinge mechanism or the like, is used to lift up the magnetic head 16 from the recording media surface of the magneto-optical disk 12. Naturally, the hinge mechanism has some play. Therefore, the position of the magnetic pole with respect to the laser spot moves by a magnitude of this play.

When this movement of the position is excessively large, the laser spot and the position of the magnetic pole are displaced from each other, resulting in the recording operation being impossible in the worst case.

SUMMARY OF THE INVENTION

According to one aspect of the invention, a magneto-optical recording and reproduction device includes an optical pickup for irradiating a magneto-optical disk with a laser beam for performing at least one of information recording to a magneto-optical disk, information reproduction from the magneto-optical disk, and information erasure from the magneto-optical disk; a magnetic head for providing a magnetic field to a position of the magneto-optical disk irradiated with the laser beam for performing at least one of the information recording and the information erasure, the magnetic head being located opposite to the optical pickup with respect to the magneto-optical disk where the magneto-optical disk is mounted on the magneto-optical recording and reproduction device; a housing for accommodating the optical pickup; a guide shaft for moving the housing; a suspension for supporting the magnetic head; and an arm for connecting the suspension and the housing. The guide shaft is on a straight line extending in a direction perpendicular to a plane of the magneto-optical disk from the center of gravity of a combination of at least the arm, the magnetic head and the suspension, so as to suppress a vibration of the arm, with the guide shaft being a fulcrum of the vibration.

In one embodiment of the invention, the magneto-optical recording and reproduction device further includes a rotation mechanism for lifting up and lowering the magnetic head, the rotation mechanism being attached to the arm, wherein the guide shaft acts as a rotation shaft of the rotation mechanism.

In one embodiment of the invention, the housing and the arm are integral with each other.

In one embodiment of the invention, the information erasure and the information recording are allowed to be performed simultaneously.

According to another aspect of the invention, a magneto-optical recording and reproduction device includes an optical pickup for irradiating a magneto-optical disk with a laser beam for performing at least one of information recording to a magneto-optical disk, information reproduction from the magneto-optical disk, and information erasure from the magneto-optical disk; a magnetic head for providing a magnetic field to a position of the magneto-optical disk irradiated with the laser beam for performing at least one of the information recording and the information erasure, the magnetic head being located opposite to the optical pickup with respect to the magneto-optical disk where the magneto-optical disk is mounted on the magneto-optical recording and reproduction device; a housing for accommodating the optical pickup; a guide shaft for moving the housing; a suspension for supporting the magnetic head; and a rotation mechanism for lifting up and lowering the magnetic head. The guide shaft acts as a rotation shaft of the rotation mechanism.

In one embodiment of the invention, the guide shaft is provided on the same plane as the magneto-optical disk or on the same side as the magnetic head with respect to the magneto-optical disk.

According to the present invention, a guide shaft for moving an optical pickup housing is on a straight line extending in a direction perpendicular to a plane of the magneto-optical disk from the center of gravity of a combination of at least a magnetic head connection arm, a magnetic head and a suspension. Due to such a structure, the up-and-down vibration of the magnetic head connection arm, with the guide shaft being a fulcrum of the vibration, which vibration causes a magneto-optical disk to vibrate, is suppressed. Therefore, a vibration component transmitted from the magnetic head connection head and the suspension to the magneto-optical disk can be suppressed.

It is preferable that the guide shaft be as close as possible to the center of gravity of the magnetic head connection arm in order to suppress the amplitude of the vibration of the magnetic head connection arm. Since the magnetic head connection arm extends substantially in a vertical direction from the magneto-optical recording and reproduction device. Therefore, the center of gravity of a combination of the magnetic head connection arm, the magnetic head and the suspension is in the vicinity of the magnetic head connection arm, and so the weight of the magnetic head connection arm is loaded on a connection portion of the housing with the magnetic head connection arm or the vicinity thereof.

In one embodiment of the invention, the guide shaft for moving the optical pickup housing also acts as a rotation shaft for a rotation mechanism for lifting up or lowering the magnetic head with respect to the magneto-optical disk. Such a structure is preferable since the precision in the position of the laser spot on the magneto-optical disk irradiated with a laser beam with respect to the magnetic field generation region of the magnetic head is improved. The size of the magnetic pole can be reduced to increase the frequency used for information recording, or the amount of heat generated can be reduced.

The vibration caused by the driving of an actuator is transmitted via the magnetic head connection arm to the magneto-optical disk and thus widely vibrates the magneto-optical disk. This vibration generally has a significant adverse influence on the servo characteristics both in a focusing direction and a radial direction. According to the present invention, the distance between the guide shaft and the magnetic head connection arm can be approximately zero. Therefore, the up-and-down vibration of the magnetic head connection arm can be sufficiently suppressed, and especially the servo characteristics in a focusing direction can be stabilized. Since the guide shaft also acts as the rotation shaft for the rotation mechanism, the number of components is decreased and the production cost is reduced.

In another embodiment of the invention, the guide shaft is located on substantially the same plane as the magneto-optical disk or on the same side as the magnetic head with respect to the magneto-optical disk. Due to such a structure, the distance in the height direction between the guide shaft and the magnetic pole (recording position) of the magnetic head can be shorter. Therefore, the precision of the position of the magnetic pole with respect to the laser spot on the magneto-optical disk irradiated with a laser beam is improved.

In a structure using a general shaft for moving the optical pickup housing, the guide shaft and a portion of the housing receiving the guide shaft need to have a clearance therebetween. Without the clearance, the guide shaft does not act as a guide shaft. Due to the clearance, the magnetic head (more precisely, the magnetic pole) vibrates with a certain amplitude with respect to the laser spot on the magneto-optical disk. This amplitude of vibration significantly depends on the distance between the guide shaft and the magnetic head. According to the present invention, in which the guide shaft is sufficiently close to the magnetic head, the influence of the clearance can be suppressed. Therefore, vibration of the magnetic head and also the suspension in a direction parallel to a recording media surface of the disk as well as the up-and-down direction can be further reduced.

In a structure using a magnetic head connection arm, a clearance is required between the magnetic head connection arm and the portion of the rotation mechanism for receiving the magnetic head connection arm. When the magnetic head connection arm is not sufficiently rigid, the displacement of the magnetic pole is larger than the clearance due to the influence of the movement of the magnetic head connection arm. In such a case, the positional relationship between the magnetic pole and the laser spot is generally adjusted by pressing the magnetic head connection arm by a stopper or the like. It is preferable to attach the magnetic head so that the magnetic pole precisely maintains a prescribed positional relationship with respect to the laser spot. This will be more strongly demanded in the future since the size of the magnetic pole will be reduced in order to raise the magnetic field generation efficiency and the magnetic force per unit current for higher-speed recording and also in order to reduce the inductance to increase the magnetic field inversion rate for obtaining a higher recording frequency. In consideration of these factors. It is preferable to use a guide shaft for moving the optical pickup housing also as a mechanism for lifting up and lowering the magnetic head, and to locate the guide shaft on substantially the same plane as the magneto-optical disk or on the same side as the magnetic head with respect to the magneto-optical disk.

In a conventional structure, it is common to use a hinge mechanism to raise and lower the magnetic head. The hinge mechanism inherently has a mechanical play, which significantly influences the precision in the positional relationship between the magnetic pole and the laser spot. According to the present invention, the guide shaft for moving the optical pickup housing also acts as the rotation mechanism for lifting up and lowering the magnetic head. Due to such a structure, the play at the hinge need not be considered unlike in the conventional structure, and the precision in the positional relationship is improved. This only leaves the clearance around the guide shaft as a factor to be considered regarding the positional precision.

By locating the guide shaft substantially on the same plane or on the same side as the magnetic head with respect to the magneto-optical disk, the distance between the guide shaft and the magnetic pole of the magnetic head is shortened. This further improves the precision in the positional relationship between the laser spot and the magnetic pole. As described above, the present invention solves the problem of the vibration of a magneto-optical disk, and reduces the number of components and also the production cost by using the guide shaft also as the mechanism for lifting up and lowering the magnetic head.

Thus, the invention described herein makes possible the advantages of providing a magneto-optical disk recording and reproduction device capable of suppressing a transmission of vibration from an actuator which drives an objective lens to a magneto-optical disk, and reducing the amount of displacement between a magnetic field generation region and a laser spot on a magneto-optical disk irradiated with a laser beam during an information recording operation.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

The inventors of the present invention performed a simulation of disk vibration using a three-dimensional CAE application, I-DEAS, developed by SDRC (USA). This application is for analyzing a machine or a mechanism using a finite element method.

For clarity, FIG. 12 is used to describe the simulation. In the simulation, three-dimensional models of a magnetic head 16, an optical pickup housing 7, a guide shaft 10 for moving the optical pickup housing 7 (hereinafter, referred to simply as "guide shaft 10"), a chassis 14, a spindle (not shown), and a magneto-optical disk 12 were respectively constructed. The models of the respective elements were assembled to form a magneto-optical disk apparatus. A certain vibration was applied to a position of the optical pickup housing 7 corresponding to an objective lens, and the vibration of the magneto-optical disk 12 right above the position of the objective lens was analyzed by simulation. When the objective lens 5 is provided in the assembly, the vibration can be applied to the objective lens 5 itself. An amplitude of the vibration at each frequency was set so that the amount of energy applied to cause the vibration was constant.

As a result of the simulation, it was found that one of the reasons for the disk vibration in the conventional magneto-optical recording and reproduction device 400 in FIG. 12 is a vibration of a magnetic head connection arm 9, with the guide shaft 10 being a fulcrum of the vibration. In an actual driving operation, the disk vibration is also caused by a vibration transmitted from a moving mechanism (not shown) for moving the optical pickup housing 7 along the guide shaft 10 and an attachment base of the spindle for rotating the magneto-optical disk 12. In any case, the inventors of the present invention found out that the problem of the disk vibration can be solved by suppressing the transmission of a vibration from the magnetic head 16 to the magneto-optical disk 12.

According to the present invention, in order to suppress the vibration of the magnetic head connection arm 9, the guide shaft 10 is provided as close as possible to the magnetic head connection arm 9, or the guide shaft 10 is integrated with the magnetic head connection arm 9. With such a structure, the vibration of the magnetic head connection arm 9 with the guide shaft 10 being a fulcrum of the vibration, is suppressed. Such a vibration of the magnetic head connection arm 9 causes the vibration of the magneto-optical disk 12.

EXAMPLE 1

Figure 1:
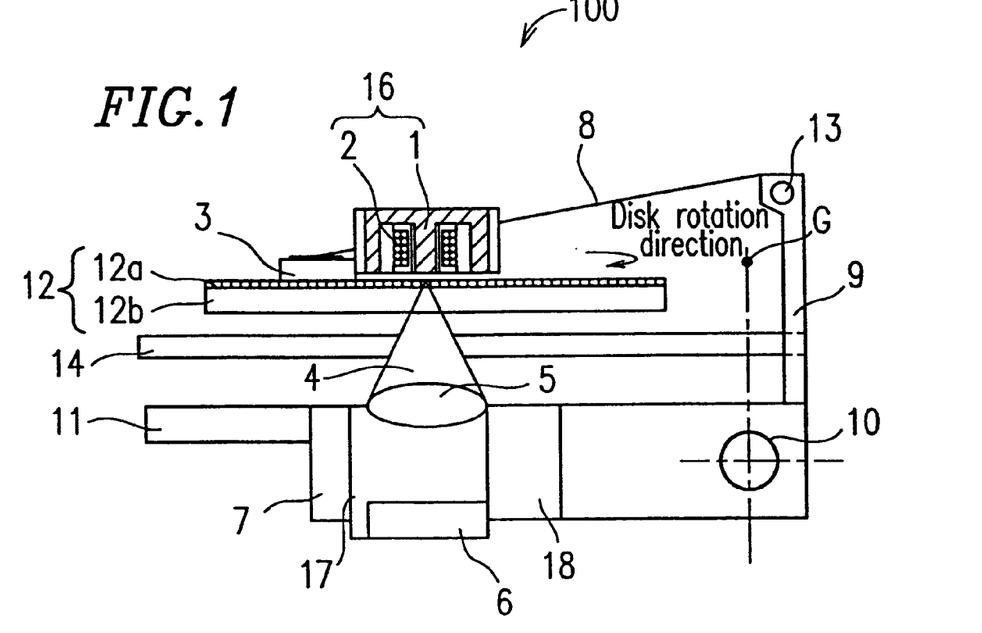
FIG. 1 is a cross-sectional view of a magneto-optical recording and reproduction device in Example 1 according to the present invention.

FIG. 1 shows an magneto-optical recording and reproduction device 100 in Example 1 according to the present invention. Identical elements previously discussed with respect to FIG. 12 bear identical reference numerals and the detailed descriptions thereof will be omitted in this and following examples.

In the magneto-optical recording and reproduction device 100 in Example 1, a guide shaft 10 is provided closer to an attachment portion of a magnetic head connection arm 9 to an optical pickup housing 7, compared to the conventional magneto-optical recording and reproduction device 400 in FIG. 12. Thus, the distance between the guide shaft 10 and the magnetic head connection arm 9 in a direction parallel to a recording media surface of a magneto-optical disk 12 becomes shorter than in the magneto-optical recording and reproduction device 400. The other elements in the magneto-optical recording and reproduction device 100 are similar to those of the conventional magneto-optical recording and reproduction device 400. The magnetic head 16 is provided opposite to the optical pickup 17 with respect to the magneto-optical disk 12.

It is preferable to integrally form the magnetic head connection arm 9 with the optical pickup housing 7. In the case where the magnetic head connection arm 9 and the optical pickup housing 7 are formed separately, the magnetic head connection arm 9 and the optical pickup housing 7 may be secured to each other by a screw or the like.

It has been confirmed that the structure shown in FIG. 1 reduces a vibration component transmitted from the magnetic head connection arm 9 to the magneto-optical disk 12 and thus suppresses an amplitude of the vibration of the magneto-optical disk 12.

More specifically, the center of gravity G of a combination of at least the magnetic head connection arm 9, the magnetic head 16 and the suspension 8 is now closer to the guide shaft 10. Preferably, as shown in FIG. 1, the guide shaft 10 is on a straight line extending in a direction perpendicular to a plane of the magneto-optical disk 12 from the center of gravity of a combination of at least the arm 9, the magnetic head 16 and the suspension 8. Thus, the amplitude of the vibration of the magnetic head connection arm 9 (with the guide shaft 10 being a fulcrum of the vibration), which causes the vibration of the magneto-optical disk 12, can be suppressed.

Figure 13:
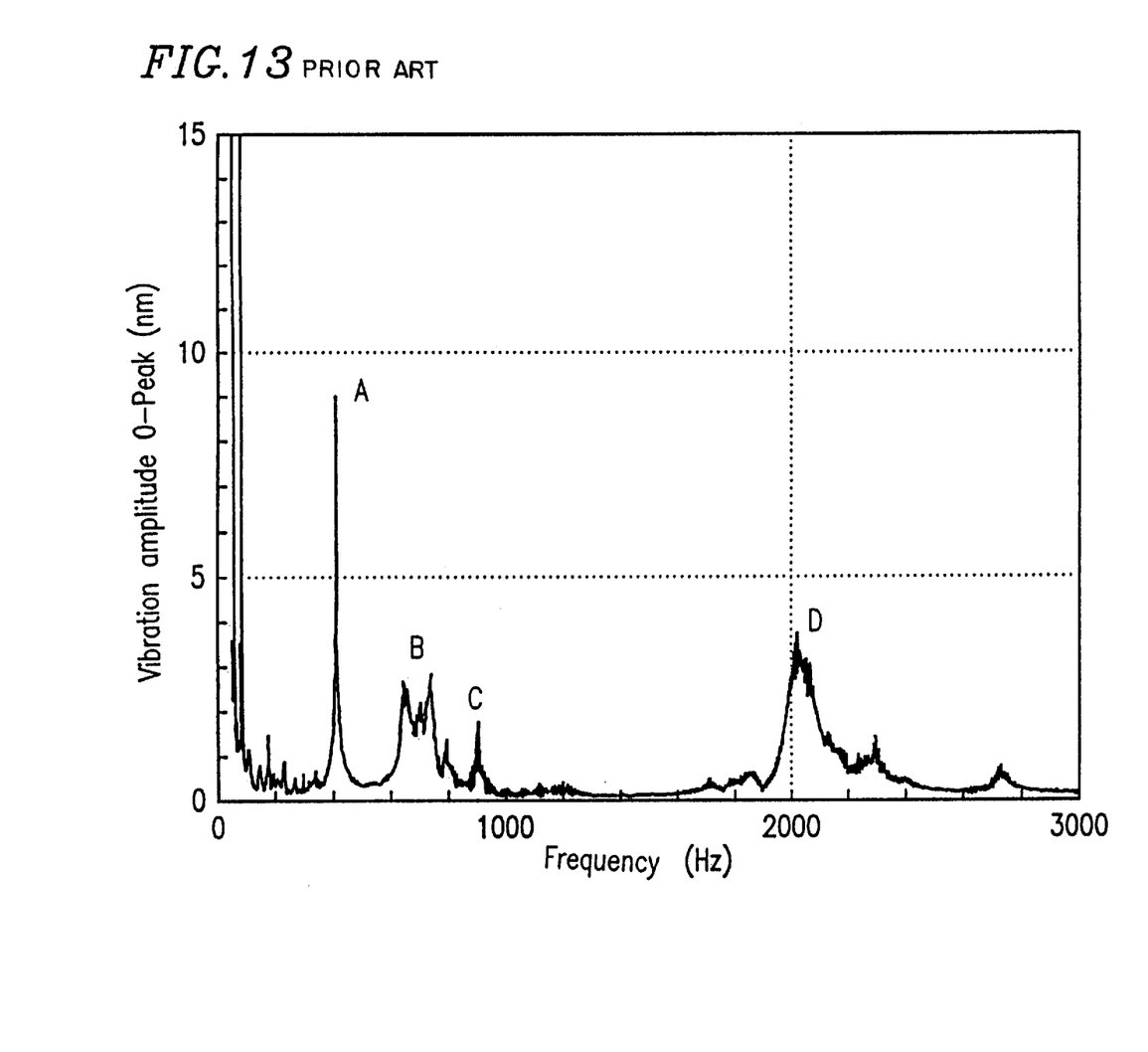
FIG. 13 is a graph illustrating disk vibration characteristics of the conventional magneto-optical recording and reproduction device shown in FIG. 12.

FIG. 13 shows results of measurement of the amplitude of the vibration in the conventional magneto-optical recording and reproduction device 400 shown in FIG. 12. More specifically, FIG. 13 shows the amplitude of the vibration of the magneto-optical disk 12 caused by the vibration of the actuator 18 of the magneto-optical recording and reproduction device 400. The actuator 18 was forcibly vibrated using an external amplifier, and the amplitude of the resultant vibration of the magneto-optical disk 12 was measured using a laser Doppler vibration meter. An MD was used as the magneto-optical disk 12, and an actuator driver for focusing was used. The measurement was performed while the magneto-optical disk 12 was rotated and the magnetic head 16 was in contact with the recording media surface of the magneto-optical disk 12.

The peak of the frequency in a lower frequency range occurred because of the warp of the magneto-optical disk 12 and the tilt of a turntable having the magneto-optical disk 12 thereon, but not because of the vibration of the magneto-optical disk 12. As shown in FIG. 13, large vibrations are observed at about 400 Hz (peak A), 700 Hz (peak B), 900 Hz (peak C) and 2 kHz (peak D).

Figure 2:
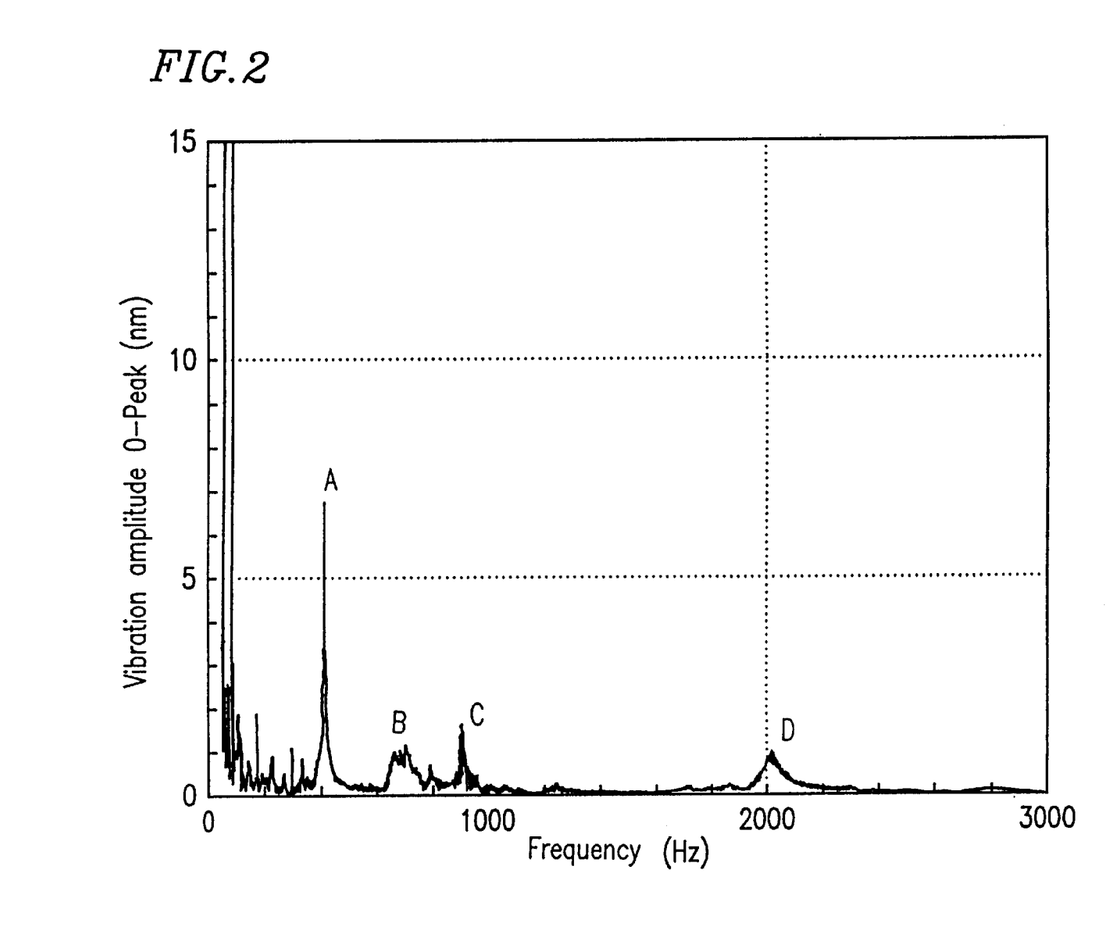
FIG. 2 is a graph illustrating disk vibration characteristics of the magneto-optical recording and reproduction device shown in FIG. 1.

FIG. 2 shows results of measurement of the amplitude of the vibration in the magneto-optical recording and reproduction device 100 shown in FIG. 1 in Example 1. More specifically, FIG. 2 shows the amplitude of the vibration of the magneto-optical disk 12 caused by the movement of the objective lens 5, which is caused by the actuator 18 of the magneto-optical recording and reproduction device 100. The vibration measured was in a focusing direction, which is perpendicular to the recording media surface of the magneto-optical disk 12.

As compared to the results shown in FIG. 13 obtained from the conventional magneto-optical recording and reproduction device 400 (FIG. 12), the amplitude of the vibration of the magneto-optical recording and reproduction device 100 in Example 1 of the present invention is reduced entirely and especially at about 400 Hz (peak A), 700 Hz (peak B) and 2 kHz (peak D). Due to such a reduced vibration amplitude, the magneto-optical recording and reproduction device 100 is improved in the stability of the servo operation and thus in the recording and reproduction characteristics.

The structure of the magneto-optical recording and reproduction device 100 in Example 1 makes the size of the optical pickup housing 7 larger in a direction parallel to the recording media surface of the magneto-optical disk 12 than in the conventional magneto-optical recording and reproduction device 400, but does not have any influence on the size thereof in a thickness direction of the magneto-optical disk 12. The structure also slightly increases the weight of the optical pickup housing 7, but the increase in weight is negligible in consideration of the magneto-optical disk apparatus in which the magneto-optical recording and reproduction device 100 is used.

FIG. 1 does not show a moving mechanism for the optical pickup housing 7, which can have a similar structure to that of a moving mechanism in Example 2.

Figure 3A:
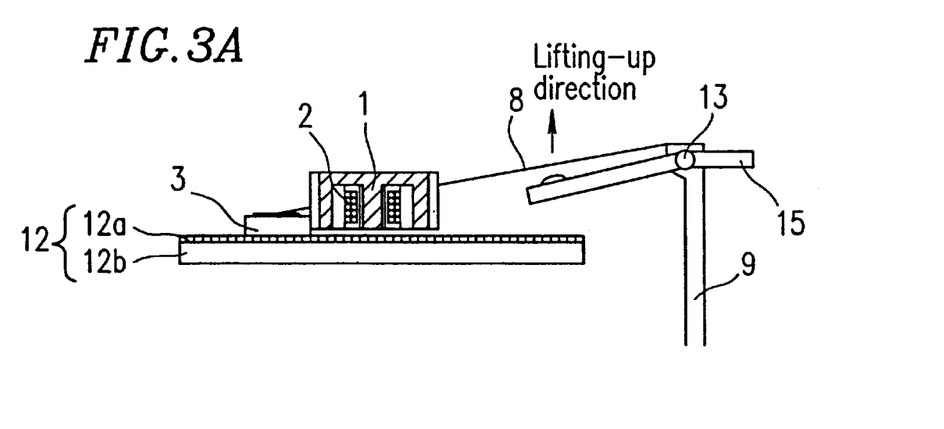
FIG. 3A is a cross-sectional view of the magneto-optical recording and reproduction device shown in FIG. 1 in the state where a magnetic head is on a magneto-optical disk.
Figure 3B:
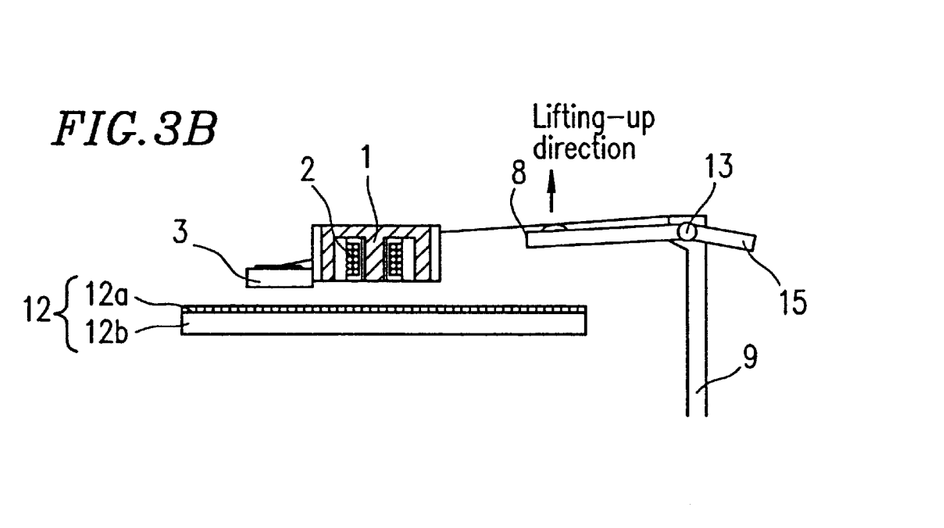
FIG. 3B is a cross-sectional view of the magneto-optical recording and reproduction device shown in FIG. 1 in the state where the magnetic head is lifted up from the magneto-optical disk.

FIGS. 3A and 3B show how the magnetic head 16 is lifted up in Example 1. A magnetic head lift lever 15 is inserted into the rotation mechanism 13, and the magnetic head lift lever 15 is rotated in the direction of the arrow in FIGS. 3A and 3B. Thus, the suspension 8 is pushed up so as to lift up the magnetic head 16.

EXAMPLE 2

Figure 4:
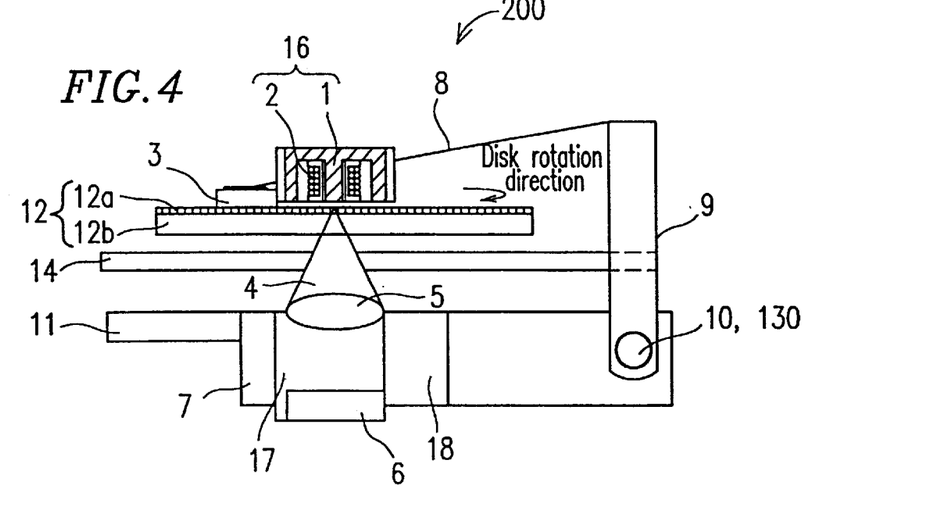
FIG. 4 is a cross-sectional view of a magneto-optical recording and reproduction device in Example 2 according to the present invention.

FIG. 4 is a cross-sectional view of a magneto-optical recording and reproduction device 200 in Example 2 according to the present invention. In the magneto-optical recording and reproduction device 200, a rotation mechanism 130 for lifting up and lowering the magnetic head 16 is rotated by the guide shaft 10 acting as a rotating shaft for the rotation mechanism 130.

Figure 5:
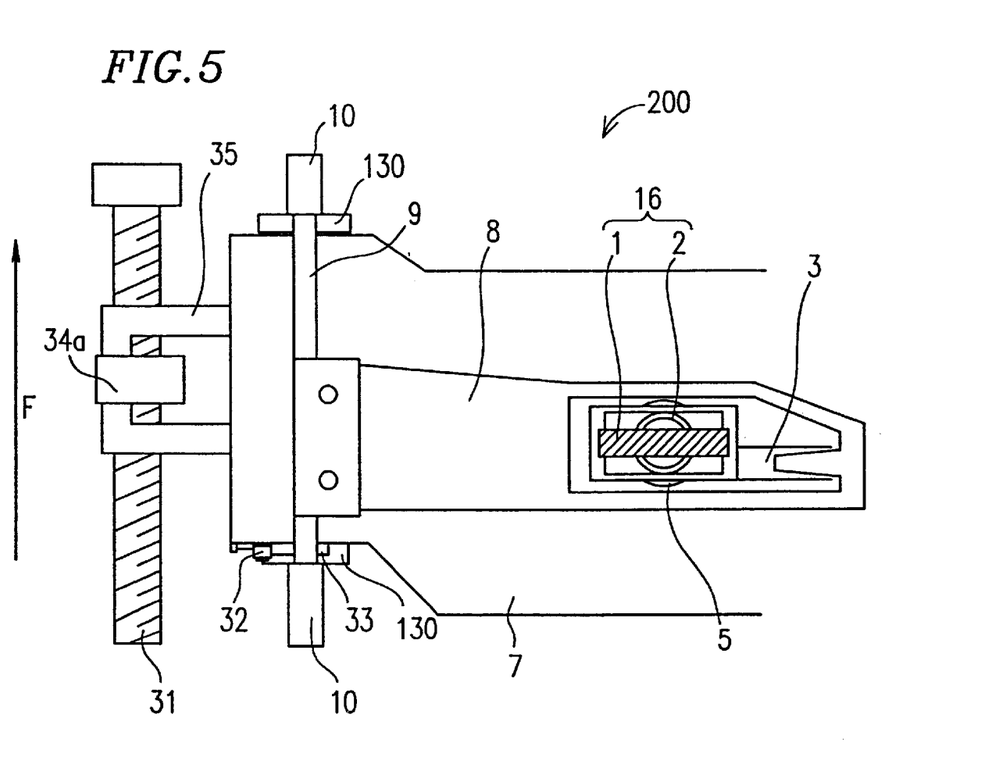
FIG. 5 is a top view of the magneto-optical recording and reproduction device shown in FIG. 4.
Figure 6:
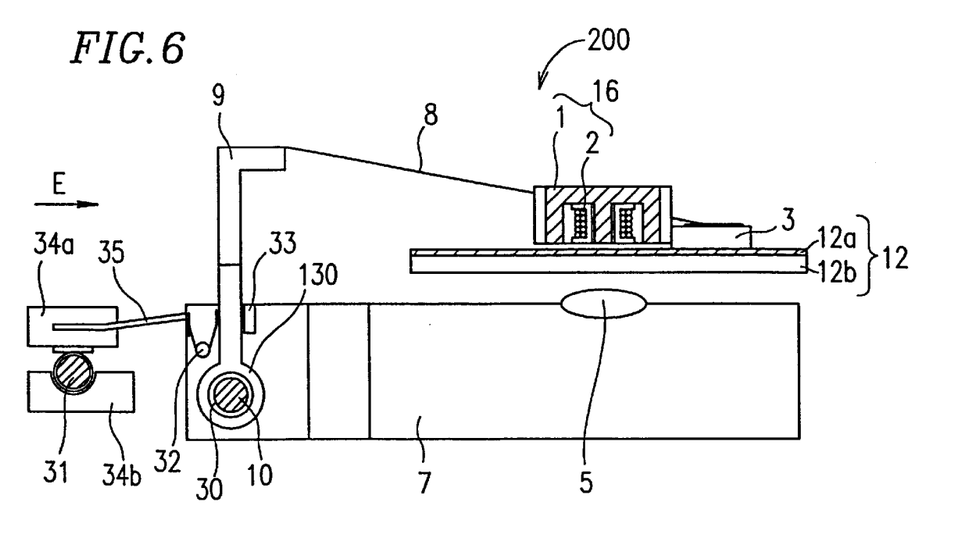
FIG. 6 is a cross-sectional view of the magneto-optical recording and reproduction device shown in FIG. 4 in the state where a magnetic head is on a magneto-optical disk.
Figure 7:
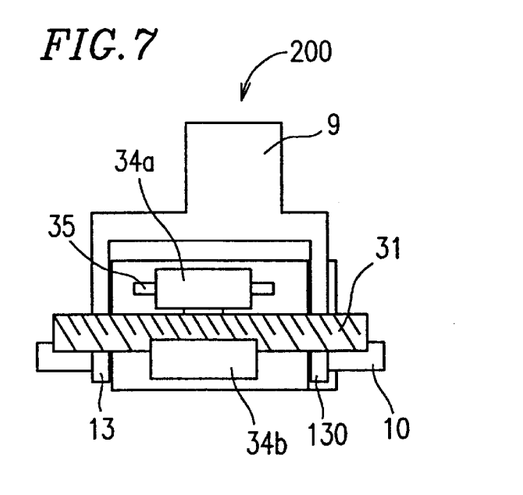
FIG. 7 is a view of the magneto-optical recording and reproduction device shown in FIG. 6 seen in the direction of arrow E in FIG. 6.
Figure 8:
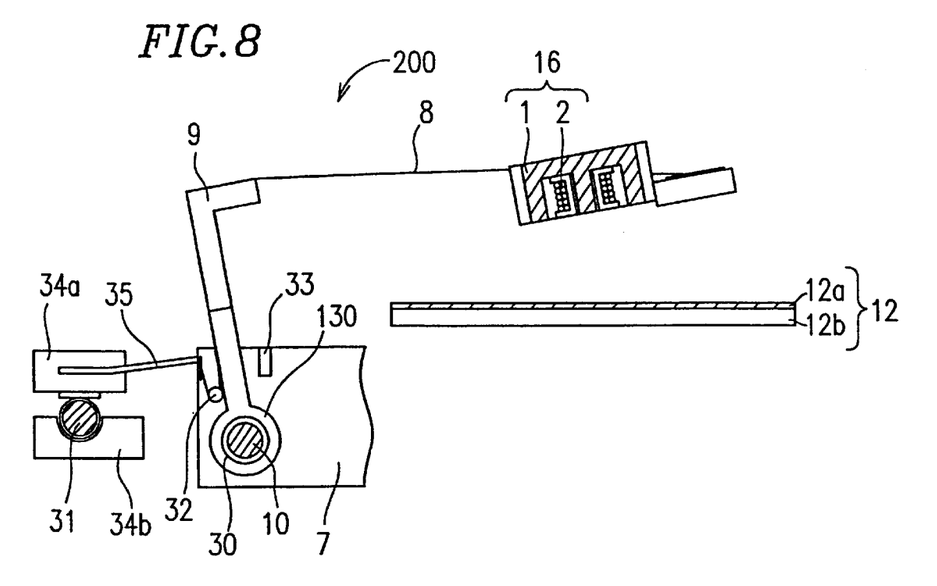
FIG. 8 is a cross-sectional view of the magneto-optical recording and reproduction device shown in FIG. 4 in the state where the magnetic head is lifted up from the magneto-optical disk.

FIG. 5 is a plan view of the magneto-optical recording and reproduction device 200. FIG. 6 is a cross-sectional view of the magneto-optical recording and reproduction device 200 in the state where the magnetic head 16 is on a recording media surface of the magneto-optical disk 12. FIG. 7 is a view of the magneto-optical recording and reproduction device 200 seen in the direction of arrow E in FIG. 6. FIG. 8 is a cross-sectional view of the magneto-optical recording and reproduction device 200 in the state where the magnetic head 16 is lifted up from the recording media surface of the magneto-optical disk 12.

The optical pickup housing 7 is moved by a feeding screw system. As shown in FIGS. 5 through 8, the feeding screw system includes a feeding screw 31, an upper rack 34a, a lower rack 34b, and a rack spring 35.

The upper rack 34a and the lower rack 34b hold the feeding screw 31 therebetween in an engaging manner. Surfaces of the upper rack 34a and the lower rack 34b which are in contact with feeding screw 31 are threaded. By rotating the feeding screw 31 in engagement with the upper rack 34a and the lower rack 34b, the optical pickup housing 7 is moved in a radial direction of the magneto-optical disk 12. The upper rack 34a is pressed by the rack spring 35 against the feeding screw 31 at a constant pressure so as not to generate play.

The magneto-optical recording and reproduction device 200 includes a subguide 11 (FIG. 4), which is held between highly slidable members (not shown) attached to the chassis. Thus, the optical pickup housing 7 is stably moved in a radial direction of the magneto-optical disk 12. FIGS. 5 through 7 omit the subguide 11, the magneto-optical disk 12, the optical pickup 17, and the photodetector 6 for simplicity.

As shown in FIGS. 6 and 8, the magnetic head connection arm 9 rotates about the guide shaft 10 so as to place the magnetic head 16 on a surface of a magneto-optical recording medium 12a of the magneto-optical disk 12 (FIG. 6) or so as to lift up the magnetic head 16 from the magneto-optical recording medium 12a (FIG. 8). Between the rotation mechanism 13 and the guide shaft 10, a bearing 30 is held. The bearing 30 is longer than the size of the optical pickup housing 7 in the direction of arrow F in FIG. 5, and is formed of a metal or other material having a relatively low friction coefficient. Since the rotation mechanism 13 is out of direct contact with the guide shaft 10 due to the bearing 30, the magnetic head connection arm 9 is prevented from receiving a force in the moving direction of the optical pickup housing 7 when the optical pickup housing 7 is moved.

When the slidable member 3 is in contact with the magneto-optical recording medium 12a, the magnetic head connection arm 9 is pressed against a stopper 33 (FIG. 6) in the direction of arrow E by a V-shaped spring 32. Due to this structure, the position of the magnetic pole with respect to a laser spot on the magneto-optical disk 12 irradiated with a laser beam is made more precise.

In Example 2, the optical pickup housing 7 is moved in a radial direction of the magneto-optical disk 12 by a combination of the guide shaft 10 and the bearing 30, and the magnetic head 16 is lifted up and lowered by the magnetic head connection arm 9 and the bearing 30 separately from the movement of the optical pickup housing 7. Since the rotation mechanism 13 is rotated around the guide shaft 10, the number of components is decreased and the precision of the position of the magnetic pole with respect to the laser spot is improved. Thus, the vibration of the magneto-optical disk 12 is reduced.

In Example 2, the feeding screw system is used to feed the optical pickup housing 7. Alternatively, a linear motor using an electromagnetic force or any other means can be used. Regardless of the means used for moving the optical pickup housing 7, the rotation mechanism 13 is allowed to rotate around the guide shaft 10.

The structure of the magneto-optical recording and reproduction device 200 in Example 2 also makes the size of the optical pickup housing 7 larger in a direction parallel to the recording media surface of the magneto-optical disk 12 than in the conventional magneto-optical recording and reproduction device 400, but does not have any influence on the size thereof in a thickness direction of the magneto-optical disk 12. The structure also slightly increases the weight of the optical pickup housing 7, but the increase in weight is negligible in consideration of the magneto-optical disk apparatus in which the magneto-optical recording and reproduction device 200 is used.

EXAMPLE 3

Figure 9:
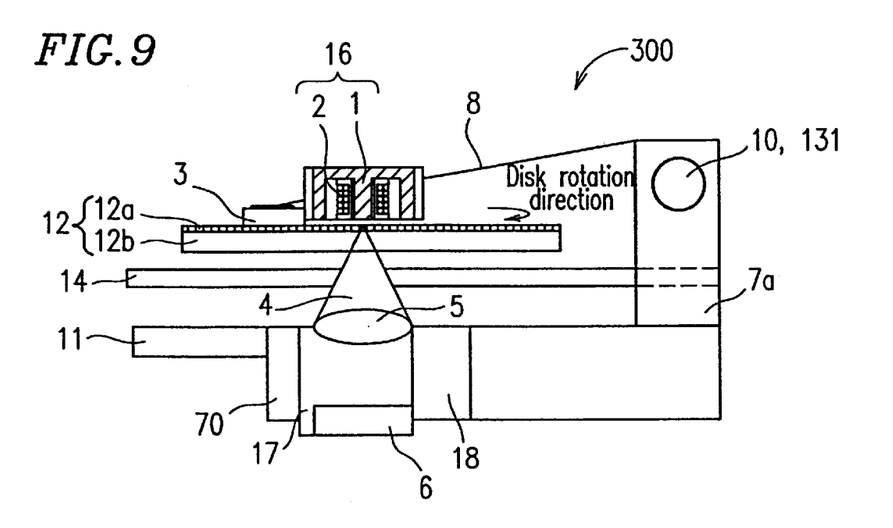
FIG. 9 is a cross-sectional view of a magneto-optical recording and reproduction device in Example 3 according to the present invention.
Figure 10A:
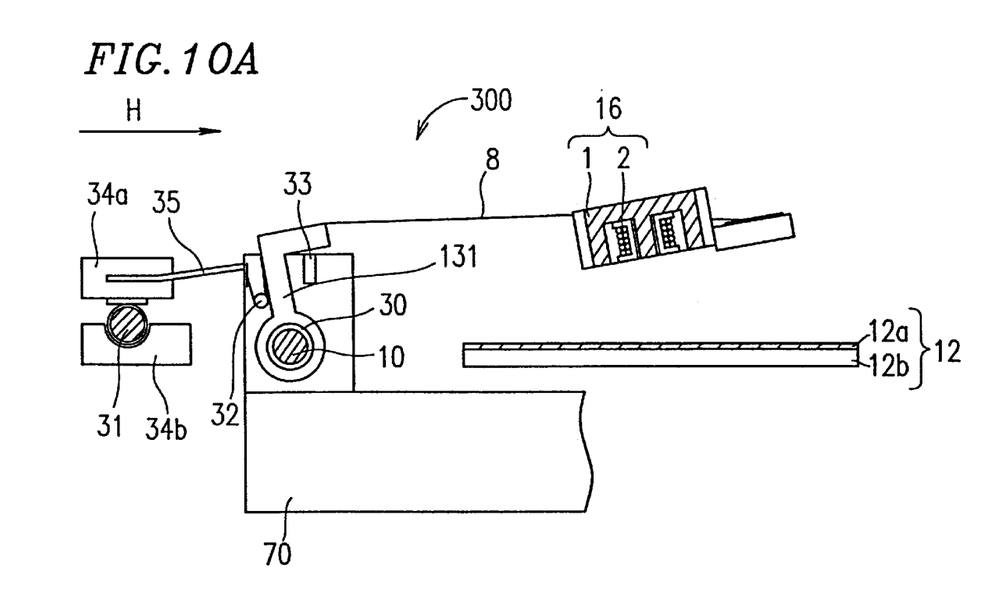
FIG. 10A is a cross-sectional view of the magneto-optical recording and reproduction device shown in FIG. 9 in the state where a magnetic head is on a magneto-optical disk.
Figure 10B:
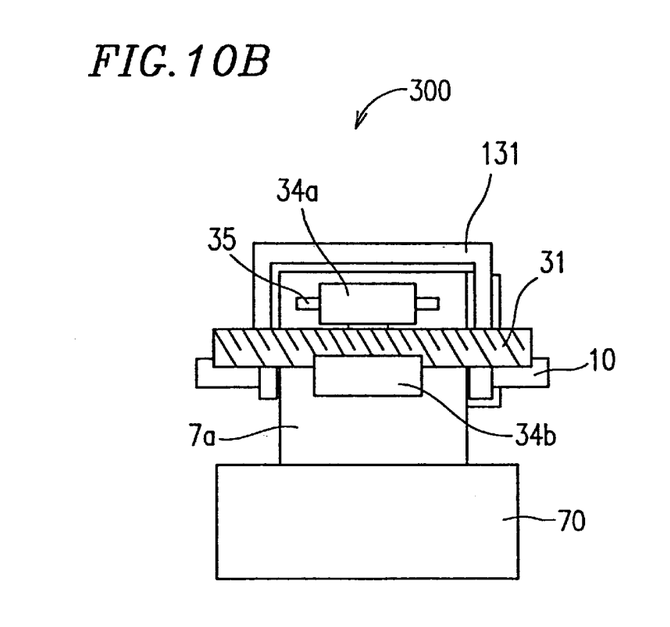
FIG. 10B is a view of the magneto-optical recording and reproduction device shown in FIG. 10A seen in the direction of arrow G in FIG. 10A.

FIG. 9 is a cross-sectional view of a magneto-optical recording and reproduction device 300 in Example 3 according to the present invention. FIG. 10A is a cross-sectional view of the magneto-optical recording and reproduction device 300 in the state where the magnetic head 16 is lifted up from the magneto-optical disk 12. FIG. 10B is a view of the magneto-optical recording and reproduction device 300 seen in the direction of arrow H in FIG. 10A.

The magneto-optical recording and reproduction device 300 includes a guide shaft 10 and a rotation mechanism 13 on substantially the same plane as the magneto-optical disk 12 or on the same side as the magnetic head 16 with respect to the magneto-optical disk 12 in the state where the magneto-optical disk 12 is mounted. In a structure where the magneto-optical disk 12 is accommodated by a cartridge (not shown), the guide shaft 10 and the rotation mechanism 13 are on substantially the same plane as the magneto-optical disk 12 or on the same side as the cartridge with respect to the magneto-optical disk 12 in the state where the magneto-optical disk 12 is mounted. Due to such a structure, the vibration of the magneto-optical disk 12 is better suppressed even than the magneto-optical recording and reproduction device 100 in Example 1 or 200 in Example 2.

The magneto-optical recording and reproduction device 300 does not include a magnetic head connection arm between the rotation mechanism 13 and the suspension 8. An optical pickup housing 70 includes an elevated portion 7a, which has the guide shaft 10 and the rotation mechanism 13. Due to such a structure, the guide shaft 10 and the rotation mechanism 13 are substantially the same plane as the magneto-optical disk 12 or on the same side as the magnetic head 16 with respect to the magneto-optical recording medium 12a of the magneto-optical disk 12. Therefore, the distance between the rotation mechanism 13 and the magnetic head 16 is shorter. Accordingly, the vibration depending on the distance between the guide shaft 10 and the magnetic pole can be suppressed.

Figure 11:
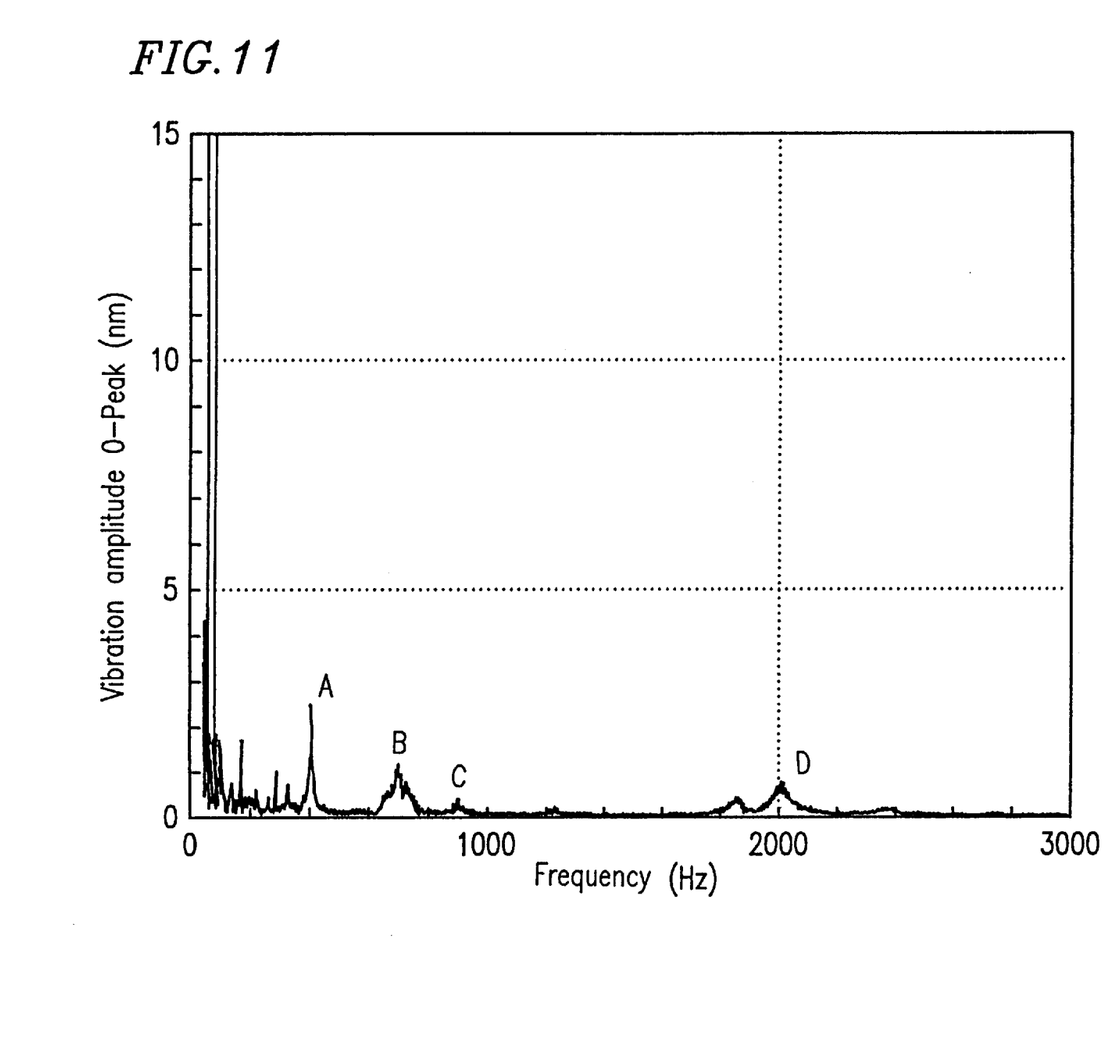
FIG. 11 is a graph illustrating disk vibration characteristics of the magneto-optical recording and reproduction device shown in FIG. 9.

FIG. 11 shows results of measurement of the amplitude of the vibration in the magneto-optical recording and reproduction device 300 shown in FIG. 9 in Example 3. More specifically, FIG. 11 shows the amplitude of the vibration of the magneto-optical disk 12 caused by the vibration of the actuator 18 of the magneto-optical recording and reproduction device 300. The vibration measured was in a focusing direction, which is perpendicular to the recording media surface of the magneto-optical disk 12.

As compared to the results shown in FIG. 13 obtained from the conventional magneto-optical recording and reproduction device 400 (FIG. 12), the amplitude of the vibration of the magneto-optical recording and reproduction device 300 is significantly reduced. Even as compared to the results shown in FIG. 2 showing the result in Example 1, the amplitude of the vibration of especially about 400 Hz is reduced to about half. These results indicate that the structure of the magneto-optical recording and reproduction device 300 further suppresses the transmission of the vibration from the actuator 18 to the magneto-optical disk 12.

In Example 3, the size of the optical pickup housing 70 is larger than that of the optical pickup housing 7 in the previous examples. In accordance with the usage, an optimum structure can be selected.

FIGS. 10A and 10B show a structure usable in Example 3 for moving the optical pickup housing 7 and lifting up or lowing the magnetic head 16. The optical pickup housing 7 is moved by the engagement of the upper and lower racks 34a and 34b with the feeding screw 31. The rotation mechanism 130 for lifting up and lowering the magnetic head 16 is rotated by the guide shaft 10 acting as a rotating shaft for the rotation mechanism 130. The suspension 8 is lifted up or lowered by a lifter (not shown) attached to the chassis (not shown) so as to raise or lower the magnetic head 16. Alternatively, the magnetic head 16 itself can be lifted up or lowered by the lifter.

The magneto-optical disk 12 is generally accommodated in a cartridge, in which case the lifter can be attached to a cartridge holder.

The present invention is applicable to an optical modulation system or a magnetic field modulation system. According to the optical modulation system, information stored on a magneto-optical disk is erased by irradiating the disk with a laser beam and thus raising the temperature of the disk. Information is recorded on a magneto-optical disk by turning the laser on or off in accordance with a recording signal while the N pole and the S pole are maintained. According to the magnetic field modulation system, information can be recorded on and erased from a magneto-optical disk simultaneously by switching the N pole and the S pole in accordance with a recording signal while the temperature of the disk is lifted up by irradiation of a laser beam.

As described above in detail, according to the present invention, the distance between a guide shaft for moving an optical pickup housing and a magnetic head connection arm is sufficiently short. Thus, the up-and-down vibration of the magnetic head connection arm can be sufficiently suppressed, which is especially conducive to stabilizing the servo operation characteristics in a focusing direction. When applied even to a magneto-optical disk apparatus reduced in size and thickness, the present invention suppresses the vibration of the disk sufficiently to provide a stable servo control in a focusing direction and a radial direction.

In the embodiment where the guide shaft for moving the optical pickup housing also acts as the rotation shaft for a rotation mechanism for lifting up or lowering a magnetic head, the vibration of the disk is further suppressed. In addition, the number of components is decreased and thus the production cost is reduced.

In the above embodiment in which the guide shaft also acts as the rotation shaft, the precision in the position of the magnetic field generation region with respect to a laser spot on the disk irradiated with a laser beam is improved. Thus, the size of the magnetic pole can be reduced, the recording frequency can be increased, and the amount of heat generated is decreased.

It is preferable that the guide shaft for moving the optical pickup housing be as close as possible to a suspension. This allows the rotation mechanism (hinge mechanism or the like) and the magnetic head to be closer to each other, which improves the precision in the positional relationship between the laser spot and the magnetic pole. In the structure where the guide shaft and the suspension are sufficiently close to each other, the vibration of the suspension in a direction parallel to the recording media surface of the disk can be suppressed as well as an up-and-down vibration of the suspension. Therefore, the vibration of the magneto-optical disk 12 is further reduced, resulting in a more stable servo operation in the focusing and radial directions. This structure also allows the guide shaft to act as the rotation mechanism. In this case, the number of components is decreased and the production cost is reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magneto-optical recording and reproduction device, comprising:

an optical pickup for irradiating a magneto-optical disk with a laser beam for performing at least one of information recording to a magneto-optical disk, information reproduction from the magneto-optical disk, and information erasure from the magneto-optical disk;

a magnetic head for providing a magnetic field to a position of the magneto-optical disk irradiated with the laser beam for performing at least one of the information recording and the information erasure, the magnetic head being located opposite to the optical pickup with respect to the magneto-optical disk where the magneto-optical disk is mounted on the magneto-optical recording and reproduction device;

a housing for accommodating the optical pickup;

a guide shaft for moving the housing;

a suspension for supporting the magnetic head; and an arm for connecting the suspension and the housing, wherein the guide shaft is on a straight line extending in a direction perpendicular to a plane of the magneto-optical disk from the center of gravity of a combination of at least the arm, the magnetic head and the suspension, so as to suppress a vibration of the arm, with the guide shaft being a fulcrum of the vibration.

2. A magneto-optical recording and reproduction device according to claim 1, further comprising a rotation mechanism for lifting up and lowering the magnetic head, the rotation mechanism being attached to the arm, wherein the guide shaft acts as a rotation shaft of the rotation mechanism.

3. A magneto-optical recording and reproduction device according to claim 1, wherein the housing and the arm are integral with each other.

4. A magneto-optical recording and reproduction device according to claim 1, wherein the magnetic head applies the magnetic field to the magneto-optical disk while the magneto-optical disk is subject to laser beam irradiation.

5. A magneto-optical recording and reproduction device, comprising:

an optical pickup for irradiating a magneto-optical disk with a laser beam for performing at least one of information recording to a magneto-optical disk, information reproduction from the magneto-optical disk, and information erasure from the magneto-optical disk;

a magnetic head for providing a magnetic field to a position of the magneto-optical disk irradiated with the laser beam for performing at least one of the information recording and the information erasure, the magnetic head being located opposite to the optical pickup with respect to the magneto-optical disk where the magneto-optical disk is mounted on the magneto-optical recording and reproduction device;

a housing for accommodating the optical pickup;

a guide shaft for moving the housing;

a suspension for supporting the magnetic head; and a rotation mechanism for lifting up and lowering the magnetic head, wherein the guide shaft acts as a rotation shaft of the rotation mechanism for lifting up and lowering the magnetic head.

6. A magneto-optical recording and reproduction device according to claim 5, wherein the guide shaft is provided on the same plane as the magneto-optical disk or on the same side as the magnetic head with respect to the magneto-optical disk.

* * * * *